Dec. 5, 1967     H. ALBERTS     3,355,771

INJECTION MOLDING APPARATUS FOR MANUFACTURING ZIPPERS

Filed July 26, 1965

INVENTOR.
HERBERT ALBERTS.
BY
Otto John Munz
ATTORNEY

United States Patent Office 3,355,771
Patented Dec. 5, 1967

3,355,771
INJECTION MOLDING APPARATUS FOR MANUFACTURING ZIPPERS
Herbert Alberts, Rua Capitao Luiz Ramos 312, Sao Paulo, Brazil
Filed July 26, 1965, Ser. No. 474,566
Claims priority, application Brazil, July 27, 1964, 7,129/64
10 Claims. (Cl. 18—30)

This invention relates to an apparatus for producing zippers. In particular, this invention relates to an improved apparatus for manufacturing zippers by injection molding techniques.

In summary, the molding apparatus of this invention is a device for making zippers comprising an injection mold means defining an injection chamber and a cooling chamber, a portion of two steel bands means passing through said chambers, said portions of the two steel band means being in mutual contact, each band means being supported upon at least two support rollers, said support rollers having axes parallel to each other and to the faces of the steel band means, the contacting faces of the steel band means having hook element molding recess openings at the first edges of said steel bands and having a textile band support recess in communication with said hook element molding recesses.

Previously known devices for the manufacture of zippers by molding the hook elements in an injection molding process provide for the simultaneous extrusion molding of only a limited section of the aforementioned hook elements onto a textile fabric carrier band. This deficiency is partly a consequence of the piston injection molding process wherein the piston must move forward and back, thus causing an interruption of the feed of material into the mold. It is also partly due to opening and closing of the mold, required to remove the molded section after it is cooled and, respectively, to permit the advance of a finished section from the coupling members and the admission of a new section. In previously known conventional injection molding processes, the length of each section of hook elements is limited because of the limited ability of the injected material to flow, by means of the supply channels, to the individual mold parts. Uniform flow requires a uniform temperature and viscosity which are difficult to maintain because the zipper consists of individual coupling members, independent of one another, each of which constitute a minute mold connected to the main supply channel by means of capillary channels. Accordingly, the above-mentioned sections must be relatively short.

In the conventional injection molding process for zippers, because of the limitations described hereinabove, a rather complicated machine is required to mass produce the zippers in a profitable manner.

When zinc zippers are extruded, from 100 to 200 sections can be extruded per minute because of the high heat conductivity and rapid cooling rate of the zinc alloy. When thermoplastic resins such as polyamides or polyacetals are extruded, this advantage is not present since these materials are poor heat conductors. Since the cooling is slower, the machine must operate more slowly, increasing the cost of the product.

It is an object of this invention to provide an apparatus for molding zippers at a high continuous rate.

It is another object to provide an apparatus which can produce zippers in sections having any length desired by a continuous injection molding process. It is also an object of this invention to provide a simple, inexpensive apparatus which provides the above objects.

The present invention is schematically illustrated in the attached drawings, wherein FIG. 1 is a side plan view of the combination of injection chamber, cooling chamber and guide of the mold-carrying steel bands or open-link chains;

Figure 1:
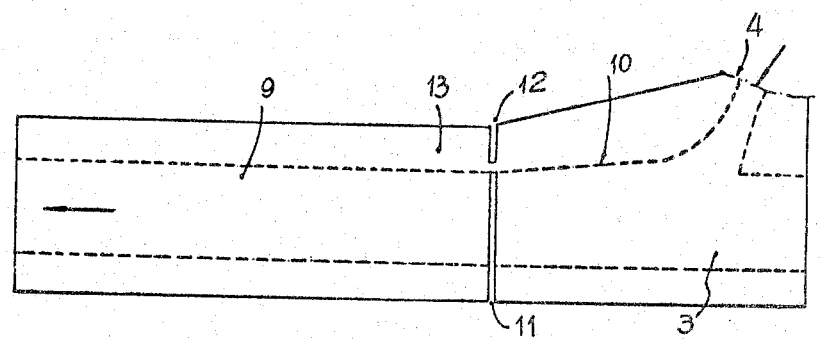
Figure 2:
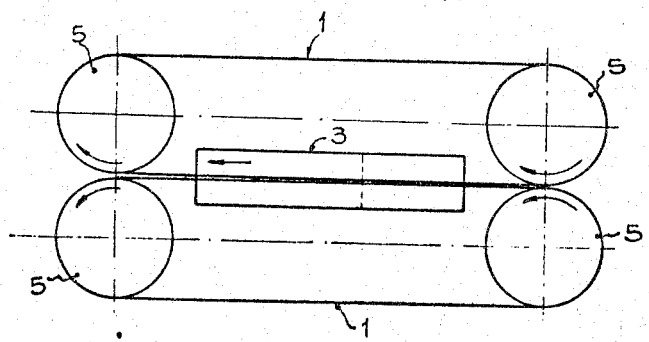
FIG. 2 is a top plan view of the two mold-carrying steel bands or open-link chains, the injection chamber, and the cooling chamber.
Figure 3:
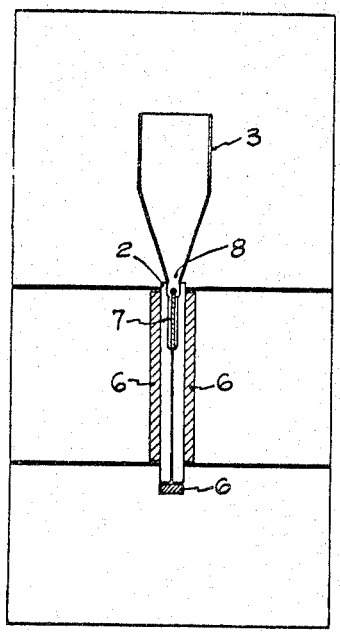
FIG. 3 is a cross-sectional view of the injection chamber and of the endless steel bands or open-link chains taken along line III—III of FIG. 1.
Figures 4, 5:
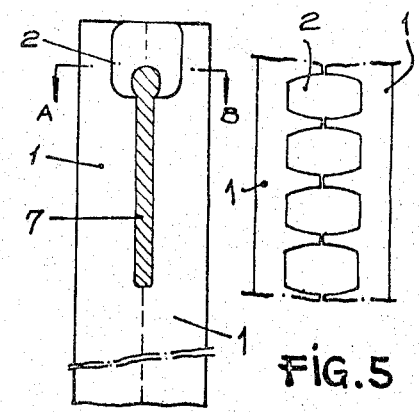
FIG. 4 is an enlarged view of a portion of FIG. 3.
FIG. 5 is a top view of FIG. 4 in the cross-section V—V thereof.

In accordance with the present invention, two endless hardened steel band means such as bands 1 provided with recessed mold halves 2, or open-link chains carrying mold halves, are passed through a chamber 3 which is filled with compressed injectable thermoplastic material. This chamber is connected, for example, to the orifice of an extrude 4, which orifice continuously supplies the molten fluid material to the chamber at a uniform rate and a constant pressure.

The endless steel bands or open-link chains 1 are each mounted on two drive rollers or disks 5 similar to a band saw.

The recessed mold halves 2 are defined by one of the surfaces of each band, extending to the rim thereof.

The molding faces of two steel bands 1 or open-link chains which are provided with recessed mold halves 2 are abutted so as to align the respective mold halves when the steel bands are passed through chamber 3. The parallel disposed steel bands 1 or open-link chains are pressed together when they pass through the injection chamber 3 by the walls thereof. The walls are segmented and hydraulically adjustable and are provided with pin bearings 6 for reducing the friction between the walls and the steel bands. Also the mold-carrying edge surfaces of the steel bands or open-link chains are enclosed by an adjustable wall 13 of the chamber 3 which prevents exit of the extrudable material. The wall 13 of the chamber 9 has the same function and is also adjustable. Any amount of thermoplastic material which might overflow in the form of a film at the upper edge surface of the mold structure will be removed with a knife or a milling operation after the molded articles leave the cooling chamber 9.

The mold recesses 2 extend to the corresponding edges or rims of the steel bands or open-link chains 1 and open at the edge therethrough. The edge openings of the molds 2 constitute the inlet for the thermoplastic material which flows into and fills the mold 2.

In contract to prior art zipper injection mold devices, the feed inlets to the molds 2 of the apparatus of this invention can be made as large as is necessary to insure adequate flow of plastic or other fluid materials. In the prior art devices, the extruded material remaining in the feed inlets after the cooling step was undesirable flashing or scrap on the finished zipper. Separate removal steps were necessary to eliminate the scrap. In order to prevent damage of the molded zipper parts during the scrap removal, it was necessary to minimize the thickness of the scrap or flashing and hence to minimize the size of the feed inlets. Otherwise, the construction or configuration of the finished articles were injured in the flashing removal operation.

This problem is not present in the device of the present invention. In the device of the present invention, there are no projection feedhead connections when the mold-carrying endless steel bands or open-link chains 1 leave the injection chamber 3 because the upper wall 10 which slopes in the direction of travel of the mold-carrying bands and approaches a position closely adjacent to the mold inlets at the end of the injection chamber. The upper wall extends in the same plane closely adjacent the mold inlets through the cooling chamber. In that case, only a thin connecting film adheres to the head pieces of the hook elements. It is apparent that the larger feed inlets permit a more rapid feed influx for the molds 2 as well as the direct injection thereof into the injection chamber 3. In accordance with the present invention, the injected material is processed under absolutely uniform conditions with respect to temperature, pressure and viscosity.

The plurality of molds consisting of mold halves 2 which are defined by recesses in endless steel bands 1 or open-link chains which serve as conveying means therefor are precisely aligned by mating pins and sockets in the contacting surfaces of the steel bands. This provides exact alignment of the mold halves 2 of the two bands with one another, and the bands form an integral unit when the same enter the injection chamber. The injection chamber constitutes a hollow chamber in the form of a channel 8 which extends upward from above the upper edges of the mold-provided bands 1 or open-link chains and parallel thereto. This channel 8 is constantly filled with injected plastic material maintained under pressure and supplies the molds 2, filling the molds as they travel through the injection chamber 3 of the supply channel. The molds are filled when they reach the end of the supply channel where the upper wall 10 reaches the upper edge of the bands. The bands are further guided in a completely closed manner through the cooling chamber 9. The chamber 9 constitutes a closed guide which has substantially no clearance between the guide surfaces and the mold-carrying bands 1 at the four sides thereof. The guide surfaces enclose the bands with a small tolerance.

It can be seen that lengthening the injection and pressure chamber 3 permits a quicker passage of the molds 2 therethrough, increasing the production rate of the machine. It can also be seen that the length of the cooling chamber 9 depends upon the length of the injection chamber 3.

The steel bands or open-link chains 1 which carry the molds 2 are additionally provided with a bed or recessed portion for receiving the textile or carrier band 7 for the hook elements since this textile band must not prevent the complete closure of the molds. The bed recesses for the aforementioned textile band 7 extend downward from the mold halves 2 and communicate therewith so that the reinforced edge of the band 7 projects between mold halves 2 in order to be rigidly connected with the hook element when the latter is injected thereinto and formed.

In accordance with the present invention, the mold carrying steel bands 1 or open-link chains may have a length of, for example, 6 meters or more. Preheating means can be provided for heating the bands after they exit from the cooling chamber 9 in order to facilitate the rapid filling of the molds 2. Refrigerant or other forced cooling means can also be provided for chamber 9 so that the length thereof may be shortened.

The inner ceiling 10 of the injection chamber 3 comprises an inclined surface in the longitudinal and traveling direction of the mold-carrying steel bands 1 or open-link chains. This gradient or incline is so provided that the inner ceiling 10, i.e. at the entry of the thermoplastic material of the injection chamber 3, is positioned at a distance from the edges of the steel bands 1 or open-link chains and gradually approaches to a position closely adjacent the head of the molds.

The cooling chamber 9 is formed as an extension of the injection chamber 3 except that the ceiling is positioned close to the molds and, covering the same, along the full length of the chamber.

The injection chamber 3 is equipped with thermocouple elements and subdivided into several adjustable heating zones, and the cooling zone 9 is equipped with a cooling unit. In order to prevent a flow of heat from the injection chamber 3 into the cooling chamber 9, the two walls of adjoining chambers are connected together by only a thin wall separated from one another by means of a small interruption. The major portions of the chamber walls are separated by cross slits 11 and 12 which do not extend into the molds 2 or the ceiling thereabove. The slits comprise a transversely-extending outer recess which terminates slightly above the molds so that the ceiling is provided, at that point, with a thin wall.

In this manner, the molds will not be affected by any interruption in the closure thereof, and the flow of heat from the injection chamber 3 to the cooling chamber 9 is greatly reduced.

Obviously, many modifications and variations of the invention as hereinabove set forth can be made without departing from the essence and scope thereof, and only such limitations should be applied as are indicated in the appended claims.

I claim.

1. A molding apparatus for making zippers comprising two steel band means, each band means being mountingly supported upon at least two support rollers, said support rollers having axes parallel to each other and to the faces of the band means, a portion of each of the faces of the band means being in mutual contact, the contacting faces of the steel band means having textile band support recess means and zipper hook element mold recess means.

2. The molding apparatus of claim 1 wherein the steel band means is an endless steel band.

3. The molding apparatus of claim 1 wherein the steel band means is an endless open-like chain.

4. The molding apparatus of claim 1 wherein hook element mold recess means are open at first edges of said steel band means for receipt of plastic material and the textile band support recess means communicates with said hook element mold recess means.

5. The molding apparatus of claim 4 wherein the steel band means are disposed between a plurality of roller pins having axes parallel to the contacting faces of said steel bands means and are in contact therewith, whereby the steel bands are maintained in contacting engagement, and second edges of the steel band means are supported by roller pins having axes perpendicular to the contacting faces of the steel band means.

6. A molding apparatus for making zippers comprising an injection mold means defining an injection chamber and a cooling chamber, a portion of two steel band means passing through said chambers, said portions of the two steel band means being in mutual contact, each band means being supported upon at least two support rollers, said support rollers having axes parallel to each other and to the faces of the steel band means, the contacting faces of the steel band means having hook element molding recess openings at the first edges of said steel bands and having a textile band support recess in communication with said hook element molding recesses.

7. The molding apparatus of claim 6 wherein a portion of the wall of the injection mold means adjacent the first edges of the steel band means is closely adjacent thereto to close the opening of the hook element molding recesses when they are filled.

8. The molding apparatus of claim 7 wherein the wall of the injection chamber adjacent the first edges of the steel band means defined an injection inlet means spaced apart from said first edges of the steel band means, said wall sloping toward said first edges in the direction of of travel of the steel bands to a position closely adjacent said edges of the steel bands.

9. The molding apparatus of claim 6 wherein the injection chamber and cooling chamber portions of the wall of the injection mold means adjacent the first edges of the steel band means define an outward extending slit therebetween, whereby the cross-sectional area of the connecting portion of said wall is reduced and heat transfer from the injection chamber wall portion to the cooling chamber wall portion is diminished.

10. The molding apparatus of claim 6 wherein the injection chamber and cooling chamber portions of the walls of the injection mold means adjacent the outer faces of the steel band means define outward extending slits therebetween whereby the cross-sectional area of the connecting portions of said walls are reduced and heat transfer from the injection chamber walls to the cooling chamber walls is diminished.

References Cited

UNITED STATES PATENTS

| 2,248,580 | 7/1941 | Morin et al. | 18—30 X |
| 2,282,308 | 5/1942 | Dahlin | 18—30 X |
| 2,817,875 | 12/1957 | Harris et al. | 18—4 |

FOREIGN PATENTS

| 873,664 | 7/1961 | Great Britain. |

J. SPENCER OVERHOLSER, *Primary Examiner.*

WILBUR L. McBAY, *Examiner.*